(12) United States Patent
Ong et al.

(10) Patent No.: US 9,609,614 B2
(45) Date of Patent: Mar. 28, 2017

(54) ACCESS NODE LOCATIONS IN A NETWORK

(75) Inventors: Ivan Ong, Malvern, PA (US); David Urban, Downington, PA (US); Clifton Lowery, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 800 days.

(21) Appl. No.: 13/483,981

(22) Filed: May 30, 2012

(65) Prior Publication Data

US 2013/0324147 A1    Dec. 5, 2013

(51) Int. Cl.
*H04W 64/00*    (2009.01)
*G01S 5/02*    (2010.01)
*H04W 84/04*    (2009.01)

(52) U.S. Cl.
CPC ........... *H04W 64/00* (2013.01); *G01S 5/0252* (2013.01); *H04W 84/045* (2013.01)

(58) Field of Classification Search
None
See application file for complete search history.

(56) References Cited

U.S. PATENT DOCUMENTS

| 4,896,315 | A | 1/1990 | Felker et al. |
| 5,198,805 | A | 3/1993 | Whiteside et al. |
| 6,349,094 | B1 * | 2/2002 | Vastano ................ H04B 7/022 370/328 |
| 6,445,927 | B1 * | 9/2002 | King ....................... G01S 5/02 342/357.29 |
| 8,918,304 | B2 * | 12/2014 | Le ........................... G01S 5/14 342/458 |
| 2003/0050079 | A1 * | 3/2003 | Tsunehara ............ H04W 64/00 455/456.1 |
| 2004/0203904 | A1 | 10/2004 | Gwon et al. |
| 2008/0274750 | A1 * | 11/2008 | Carlson ..................... G01S 5/12 455/456.1 |
| 2009/0310593 | A1 * | 12/2009 | Sheynblat ............. H04J 3/0638 370/350 |

(Continued)

FOREIGN PATENT DOCUMENTS

| EP | 2079259 A1 | 7/2009 |
| WO | 2007/056738 A2 | 5/2007 |
| WO | 2011/047721 A1 | 4/2011 |

OTHER PUBLICATIONS

Jared Newman, AT&T's 'Mark the Spot' iPhone App Admits Coverage Woes, PC World, Dec. 7, 2009, 5 pp.

(Continued)

*Primary Examiner* — Vladimir Magloire
*Assistant Examiner* — Frank Donado
(74) *Attorney, Agent, or Firm* — Banner & Witcoff, Ltd.

(57) ABSTRACT

Disclosed systems and methods relate to determining and optimizing a location of an access node within a network. In one aspect, a computing device may analyze information related to location, timing delays, and wireless (e.g., Wi-Fi) parameters such as signal strength to confirm and/or optimize the location of an access node. The location information may include global positioning system (GPS) coordinates of the access node and user devices, and the timing delay information may include data associated with delays in transmitting a signal from a provider to a device associated with the access node and nearby devices.

18 Claims, 6 Drawing Sheets

Based on the type of discrepancies, decide which of the data (e.g., known location information, system information, timing offsets, etc.) are accurate (301c)

↓

Collect and analyze measurements from user devices in order to confirm the GPS coordinates of the access node (303c)

↓

Determine optimum location for access node (305c)

↓

Use the optimized access node location to generate optimized coverage data for area (307c)

(56) References Cited

U.S. PATENT DOCUMENTS

| | | | |
|---|---|---|---|
| 2010/0144366 A1 | 6/2010 | Ishii et al. | |
| 2011/0205964 A1* | 8/2011 | Fix | G01S 5/0252 370/328 |
| 2012/0052883 A1* | 3/2012 | Austin | G01S 5/0063 455/456.6 |
| 2012/0071181 A1* | 3/2012 | Guillouard | H04W 56/0045 455/500 |
| 2012/0076016 A1 | 3/2012 | Robbins et al. | |
| 2012/0188884 A1* | 7/2012 | Simonsson | H04W 36/0083 370/252 |
| 2012/0208552 A1* | 8/2012 | Siomina | H04W 64/003 455/456.1 |
| 2013/0102325 A1* | 4/2013 | Flanangan | H04W 64/003 455/456.1 |
| 2013/0102328 A1* | 4/2013 | Kalofonos | H04W 4/02 455/456.2 |
| 2013/0150054 A1* | 6/2013 | Axmon | H04W 36/32 455/440 |
| 2013/0207842 A1* | 8/2013 | Small | H01Q 3/005 342/372 |
| 2014/0016621 A1* | 1/2014 | Zhang | H04W 56/0055 370/336 |

OTHER PUBLICATIONS

Austin et al., AT&T Labs Research—The Official Story on AT&T Mark the Spot, Oct. 5, 2010, 11 pp.

Albano et al., Design of Wireless Home Network, presented at the Society of Cable Telecommunications Engineers (SCTE) Cable-Tec Expo '11, Nov. 15-17, 2011, Atlanta, , GA, 56 pp.

GSMA: "Femtocell Deployment Security Issues White Paper", 3GPP DRAFT; S3-081097 GSMA FCG Security white paper, 3rd generation partnership project (3GPP), Mobile competence centre; 650, route des Lucioles; F-06921 Sophia-Antipolis Cedex; France, No. Sophia; Sep. 18, 2008, Sep. 18, 2008, XP050334141.

Extended European Search Report—EP 12163635.1—Mailing Date: Oct. 9, 2013.

European Office Action—EP App 13169453.1—Dated Mar. 16, 2015.

EP Response to Office Action—EP Appl. 13169453.1—submitted Sep. 18, 2015.

* cited by examiner

ACCESS NODE LOCATIONS IN A NETWORK

FIELD

Aspects of the disclosure present methods and systems related to determining and optimizing the location of access nodes and using such information, for example, for generating coverage data (e.g., maps) in a network such as a content delivery system.

BACKGROUND

Access nodes are typically hardware devices that provide users with access to content. For instance, access nodes may be outdoor components located directly on physical communication strands and may include different types of components, including modems, routers, and other types of gateways. Mobile user devices such as smart phones and laptops may wirelessly access content by communicating with a gateway associated with an access node.

Each access node may be associated with a coverage area, and each coverage area may be represented pictorially on a coverage map. Coverage data (e.g., maps) for a network may offer insights into the expected signal strength received from access nodes in areas serviced by the network. Currently, coverage maps are generated from a limited set of data related to the estimated transmit power of access nodes in the network. Conventional techniques produce coverage maps that consist of an estimated circle plot to inform users about the extent to which coverage may extend based on the presumed location of an access node. Conventional coverage maps may not accurately reflect the coverage area associated with an access node for a multitude of reasons, including the presence of unknown obstructions (e.g., buildings, foliage, etc.) and/or interference (e.g., radio frequency (RF), etc.) within the coverage area.

Accurately locating and optimizing the location of access nodes within a network may play a key role in creating more accurate coverage data (e.g., maps). For instance, without accurately knowing where an access node is located, a network may not be able to move the access node to create more optimal coverage data (e.g., maps) within a given area. The location of the access node may not accurately be known for a number of reasons; for instance, an access node may have been moved from an earlier location and this move may not have been properly documented. In addition, when the access node is initially installed, the installation may reference hard-to-track, easily misdocumented, and/or imprecise landmarks such as utility poll numbers and/or cross-streets to pinpoint where the node is to be placed.

Therefore, better methodologies are needed to determine and optimize the location of access nodes, for example, for creating coverage data (e.g., maps) that are more responsive to the needs of users and networks.

BRIEF SUMMARY

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

To overcome limitations in the prior art, and to overcome other limitations that will be apparent upon reading and understanding the present specification, the present disclosure is directed to a method and system for accurately determining the location of an access node within a network and for optimizing (e.g., adjusting) this location in generating coverage data (e.g., maps) that allow users to more accurately assess a level of service attainable for a given location.

Aspects of the disclosure allow for accurately locating an access node based on various data. This data may include location coordinates of user devices, such as global positioning system (GPS) coordinates of user devices accessing content from the access node. Access nodes may also be located based on received signal strength indicators (RSSI) associated with user devices receiving signals (e.g., wireless, Wi-Fi, etc.) from the access node. In addition, access nodes may be located based on a timing offset that represents the amount of time delay for propagation of signals, e.g., signals transmitted from a server managed by a network associated with the access node, to reach a device included in the access node and/or other locations. In yet further aspects, location information such as system maps that include a presumed location of an access node may be used to pinpoint the location of the access node, among other things.

Aspects of the disclosure relate to a system/method in which coverage data (e.g., maps) for a network, such as a communications or a content delivery network, may be created and dynamically updated based on location information (e.g., GPS coordinates) of user devices accessing content from an access node, system information (e.g., maps) that show the network including the access node, timing offset information that includes a time delay for transmitting a signal from a server managed by a network associated with the access node to a device included in the access node and/or other locations, and RSSI levels at user devices accessing content from the access node, among other things. This information may also be used to determine whether an access node is being used to its full potential and/or whether to move the access node to a new location.

Aspects of the disclosure may allow users to voluntarily and securely provide information to a server associated with a network for use in determining and optimizing the location of an access node and for use in building more accurate coverage and/or usage maps.

Aspects of the disclosure may be provided in a computer-readable medium having computer-executable instructions to perform one or more of the process steps described herein.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Figure 1:
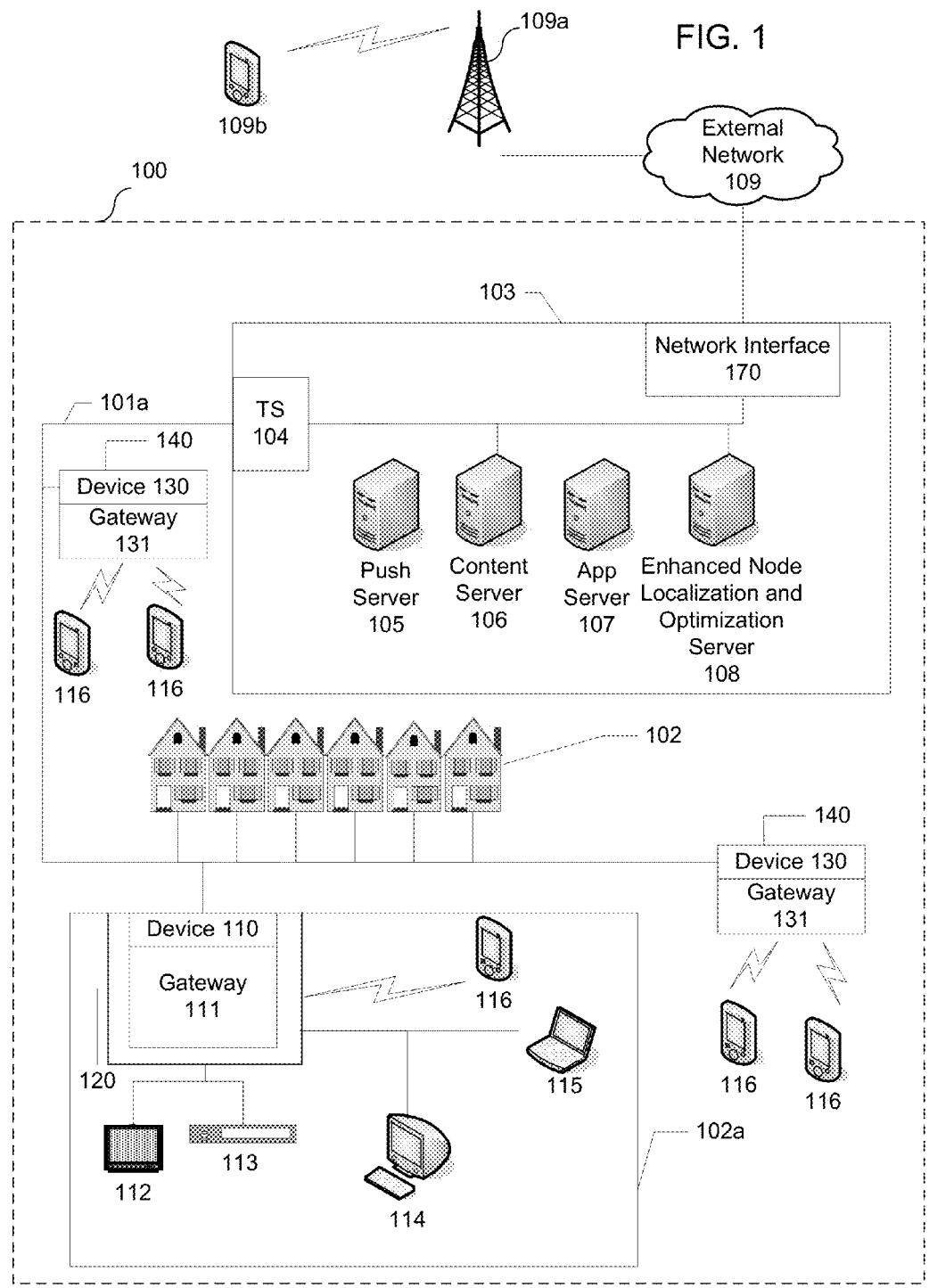
FIG. 1 illustrates an example network in accordance with various aspects of the disclosure.

FIG. 1 illustrates an example network 100, such as a telecommunications or a content delivery network, on which many of the various features described herein may be implemented. One example may be an optical fiber network, a coaxial cable network, or a hybrid fiber/coax (HFC) distribution network. Such networks 100 may use a series of interconnected communication lines 101a (e.g., coaxial cables, optical fibers, wireless links, etc.) to connect access nodes 140 and other locations 102 to a central location or office (e.g., headend) 103. The central office 103 may transmit downstream information signals onto the lines 101a to access nodes 140 and other locations 102. Each access node 140 and other locations 102 may have a receiver used to receive and process those signals.

There may be one line 101a originating from the central office 103, and it may be split a number of times to distribute the signal to various access nodes 140 and other locations 102 in the vicinity (which may be many miles) of the central office 103. Herein, access nodes 140 may refer to hardware modules including a device 130, such as a modem, and a gateway interface 131. In some aspects, an access node 140 may refer to a wireless (e.g., Wi-Fi, etc.) hotspot that allows various user devices 116 (wireless laptops and netbooks, mobile phones, mobile televisions, personal digital assistants (PDA), etc.) to connect to network 100 and external networks 109 for access to various content, including content found over the Internet. Device 130 may include transmitters and receivers used to communicate on the lines 101a and with the central office 103. Within a given access node 140, device 130 may be, for example, a coaxial cable modem (for coaxial cable lines 101a), a fiber interface node (for fiber optic lines 101a), or any other desired device. Meanwhile, the gateway interface device 131 may be a computing device (e.g., a router for wireless (e.g., Wi-Fi, etc.) connectivity, etc.) that communicates with the device 130 to allow one or more wireless devices 116 to communicate with the central office 103 and other devices beyond the central office 103, such as those devices connected to the external networks 109. The gateway 131 may also include wireless network interfaces (not shown) to provide communication signals to wireless devices 116.

Meanwhile, locations 102 may be any type of user premises, such as homes, businesses, institutions, etc. The lines 101a may include components not illustrated, such as splitters, filters, amplifiers, etc. to help convey the signal clearly, but in general each split introduces a bit of signal degradation. Portions of the lines 101a may also be implemented with fiber-optics, while other portions may be implemented with other types of lines or wireless communication paths.

The central office 103 may include an interface, such as a termination system (TS) 104, which may be a computing device configured to manage communications between devices on the network of lines 101a and backend devices such as servers 105-108 (to be discussed further below). Backend devices such as servers 105-108 may be located in close proximity to one another (e.g., in the same building) and/or far apart (e.g., separate cities, countries, etc.) and may be connected to one another over various communication platforms, including over a cloud computing environment. The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems 130, 110 at the various access nodes 140 and other locations 102, and to receive upstream communications from devices 130, 110 on one or more upstream channels or frequencies. The central office 103 may also include one or more network interfaces 170, which can permit the central office 103 to communicate with various other external networks 109. That is, the network interface 170 may include circuitry needed to communicate with one or more external networks 109 and their corresponding devices. These external networks 109 may include, for example, networks of Internet devices, telephone networks, cellular telephone networks, fiber optic networks, local wireless networks (e.g., WiMAX), satellite networks, and any other desired network. For example, the external network 109 may include a cellular telephone network 109a and its corresponding cell phones 109b.

As noted above, the central office 103 may include a variety of servers 105-108 that may be configured to perform various functions, including providing content to access nodes 140 and other locations 102, cell phones 109b, and other devices on the external networks 109. For example, the central office 103 may include a push notification server 105. The push notification server 105 may generate push notifications to deliver data and/or commands to various access nodes 140 and other locations 102 in the network (or more specifically, to the devices in access nodes 140 and other locations 102 that are configured to detect such notifications). The central office 103 may also include a content server 106. The content server 106 may be one or more computing devices that are configured to provide content to users at access nodes 140 and/or locations 102. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server 107 may be responsible for collecting data such as television program listings information and generating a data download for electronic program guide listings. Another application server 107 may be responsible for monitoring user viewing habits and collecting that information for use in selecting advertisements. Another application server 107 may be responsible for formatting and inserting advertisements in a video stream being transmitted to access nodes 140 and other locations 102. And another application server 107 may be responsible for receiving user remote control commands, and processing them to provide an intelligent remote control experience.

In addition, the central office 103 may include an enhanced node localization and optimization server 108 to locate an access node 140 on the network of lines 101a. Once located, server 108 may also run various algorithms to determine if access node 140 should be moved to a different location to generate more accurate coverage data (e.g., maps) of the area serviced by access node 140. In performing these functions, server 108 may also request, collect, store, and analyze various data from access nodes 140 and user devices 116, including data about the location (e.g., global positioning system (GPS) coordinates) of user devices 116 and access node 140, timing offset information related to time delays associated with transmitting a signal from TS 104 to devices 130 and devices 110, system information (e.g., maps), and/or wireless (e.g., Wi-Fi) received signal strength indicator (RSSI) levels for user devices 116.

An example location 102a (e.g., one of locations 102) may include an interface 120. Similar to an access node 140, the interface 120 may comprise a device 110, such as a modem, which may also include transmitters and receivers used to communicate on the lines 101a and with the central office 103. The device 110 may be connected to, or be a part of, a gateway interface device 111. Similar to gateway interface device 131, the gateway interface device 111 may be a computing device that communicates with the device 110 to allow one or more other devices at the location 102a to communicate with the central office 103 and other devices beyond the central office 103, such as those devices connected to the external networks 109. In some embodiments, the gateway interface device 111 may operate to communicate with devices 112-116 located over a smaller distance than the distance between gateway 131 and user devices 116. The gateway 111 may be a set-top box (STB), digital video recorder (DVR), computer server, or any other desired computing device. The gateway 111 may also include local network interfaces (not shown) to provide communication signals to devices 112-116 at location 102a, such as televisions 112, additional STBs 113, personal computers 114, laptop computers 115, wireless devices 116 (wireless laptops and netbooks, mobile phones, mobile televisions, personal digital assistants (PDAs), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
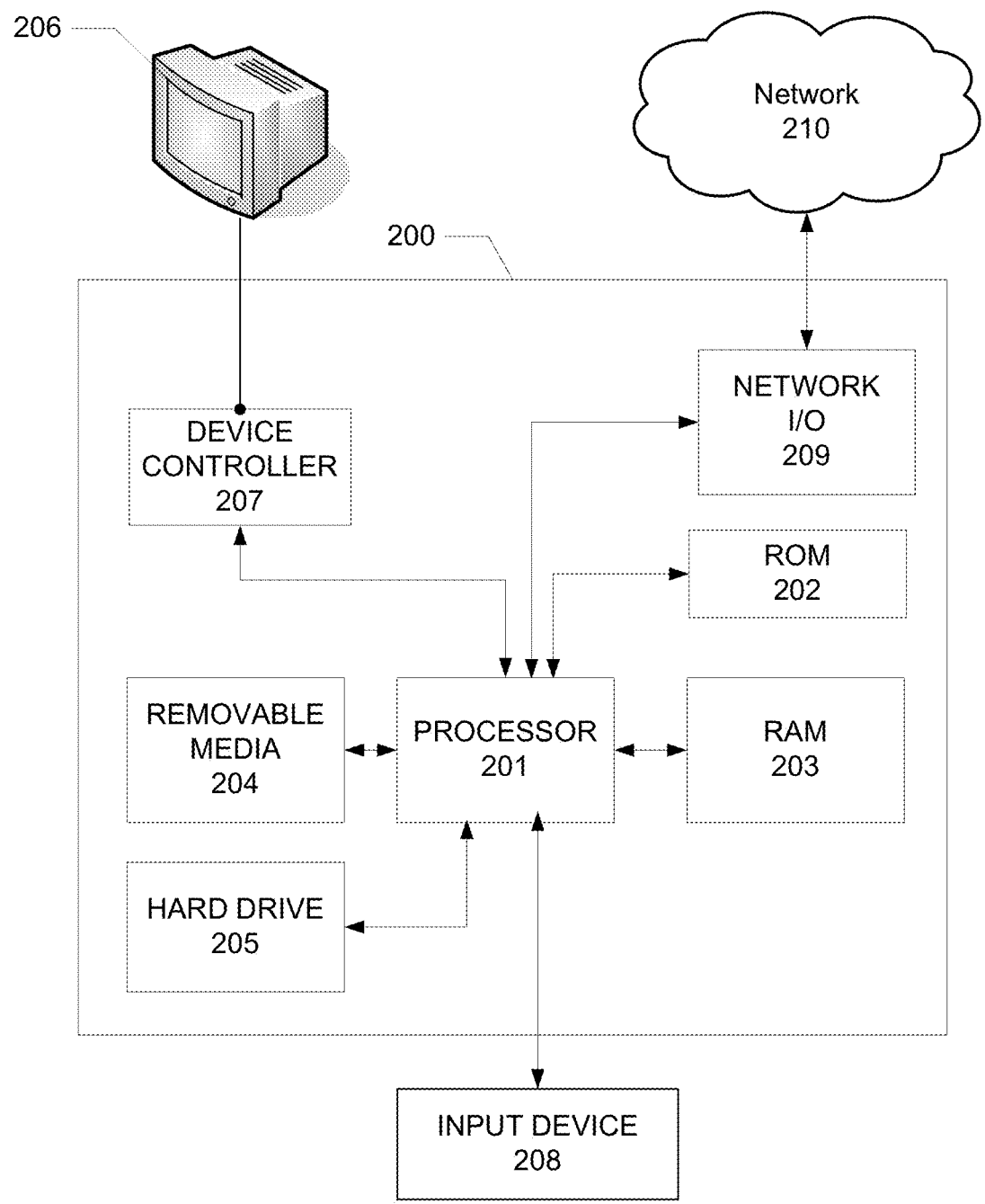
FIG. 2 illustrates an example hardware and software platform on which various elements described herein can be implemented in accordance with various aspects of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD) drive, and/or floppy disk drive, or any other desired electronic storage medium. Instructions and/or other data may also be stored in an attached (or internal) hard drive and/or data repository 205. The computing device 200 may include one or more output devices, such as a display 206, and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (e.g., a network card) to communicate with a network 210. The network interface 209 may be a wired interface, wireless interface, or a combination of the two. In some embodiments, the network interface 209 may include a device (e.g., a cable modem), and the network 210 may include the communication lines 101a discussed above, the external network 109, an in-home network, a provider's wireless, coaxial, fiber, or hybrid fiber/coaxial distribution system (e.g., a DOCSIS network), or any other desired network.

One of ordinary skill in the art would recognize that one or more computing devices discussed herein may include some or all of the components discussed in FIG. 2, along with additional components.

As mentioned above, this disclosure identifies problems associated with localizing access nodes 140 and with generating accurate coverage data (e.g., maps) associated with those access nodes 140 in a network 100.

In accordance with some aspects of the disclosure, a wireless device 116 may want to access content or communication capabilities provided by an access node 140 in the network 100. When a user of device 116 receives access to network 100, a network server (e.g., enhanced node localization and optimization server 108) managed by a network's central office 103, for example, may transmit a request to the user of device 116 to confirm if he/she would agree to information being transmitted to server 108 to be used for the purpose of network optimization. In some embodiments, this request may be transmitted as part of a general terms of service. In other embodiments, the request may be transmitted as part of a secondary request for the specific purpose of allowing devices 116 to transmit requested information to server 108.

If the user does not agree to the information being transmitted to server 108, the information may not be transmitted to server 108. If the user agrees, then information such as the location (e.g., GPS coordinates) and wireless (e.g., Wi-Fi) signal strength information of user device 116 may be automatically transmitted to server 108 at predetermined intervals.

In other aspects, a computing device 116 (e.g., cell phone, diagnostic tool, laptop, etc.) located within the coverage area of a given access node 140 may be used to transmit the required wireless (e.g., Wi-Fi) and location (e.g., GPS) information to server 108. With this method, other users (e.g., customers) of the content or communications provider may not have to agree to allow server 108 to automatically receive information (e.g., location information, Wi-Fi info, etc.) from other user devices 116.

Aspects of the disclosure recognize that enhanced node localization and optimization server 108, or a computing device performing similar functions, may request, receive, store, and analyze various information to determine and/or optimize the location of an access node 140. For instance, server 108 may use system information (e.g., maps) detailing a presumed position of a given access node 140, timing offset information detailing timing delays for delivering signals, for example, from TS 104 to a device 130 that is part of the access node 140 and to devices 110 that are located at other locations 102, location information such as the GPS coordinates of user devices 116 seeking to access content through the access node 140, wireless (e.g., Wi-Fi) information such as RSSI levels of user devices 116, and/or information gathered from a computing device 116 operated by an employee (e.g., during installation of access node 140, through a technician visit, etc.) of a content or communications provider managing the access node 140. Server 108 may store and continuously or periodically update all or a portion of such data in a local and/or remote storage repository that is accessible when server 108 needs the data for use in determining and/or optimizing the location of an access node 140. Server 108 may recognize that each of the different types of data mentioned herein may have a built-in level of accuracy for use in localizing a given access node 140. In certain aspects, server 108 may represent the uncertainty for each type of data by a circle plot with a predetermined radius; by considering all of the different types of data together, server 108 may use the intersection point of all circles to more accurately and precisely determine and/or optimize the location of an access node 140.

A network 100 may store system information (e.g., maps) in any database associated with central office 103. System information (e.g., maps) may depict, for example, the communication backhaul of network 100. Server 108 may use system information (e.g., maps) (e.g., of system 100) to pinpoint possible locations of an access node 140 by showing that the access node 140 is located, for example, somewhere along a communication line 101a (e.g., wireless link, coaxial cable, fiber, etc.) and/or between communication (e.g., telephone) poles. Server 108 may also analyze system information (e.g., maps) to indicate locations where an access node 140 may not be located; for instance, server 108 may scan system information (e.g., maps) to conclude that an access node 140 may not be located in the exact same position as existing amplifiers, fiber nodes, power supplies, directional couplers, and/or taps in system 100. In addition, server 108 may use system information (e.g., maps) to extract information regarding specific types and lengths of transmission media 101a (e.g., coaxial cable, fiber, etc.) that are used within a network 100. Furthermore, server 108 may analyze system information (e.g., maps) to determine if a current location of an access node 140, once confirmed, is too far from users of user devices 116. As noted earlier, during its analysis, server 108 may recognize that system information (e.g., maps) may not always be up-to-date and/or accurate, and therefore, may not be relied upon as the only piece of information for localizing an access node 140.

The timing offset for devices 130 and/or 110 (e.g., a cable modem or optical node) may be a measure of the time it takes to send a signal from the devices 130, 110 to a TS 104 through the network of lines 101a. TS 104 may include hardware/software modules to generate timing offset information for each device 130, 110 and may forward this information to server 108 for use in localizing/optimizing the location of any given access node 140. Server 108 may use timing offset data for devices 130, 110 to determine the exact lengths of various types of transmission lines (e.g., fibers, etc.) that reside between a TS 104 and device 130, 110. Server 108 may calculate the timing offset for device 130, 110 by using a simple distance equals the product of rate (e.g., velocity of signal propagation) and time formula. In calculating the timing offset, server 108 may also take into account that different portions of the distance have different types of transmission lines 101a such that the velocity of signal propagation in each type of transmission line is different. For instance, server 108 may use the following formula for calculating the timing offset for a given device 130, 110:

$$t = \frac{d_1}{d_1} + \frac{d_2}{r_2} + \ldots + \frac{d_n}{r_n}$$

where t is the total timing offset for signal propagation from a device 130, 110 to TS 104, $d_1 \ldots d_n$ are the lengths of the different types of transmission media 101a connecting device 130, 110 to the TS 104, and $r_1 \ldots r_n$ are the corresponding velocities of signal propagation for the different types of transmission media 101a connecting device 130, 110 to TS 104.

In one embodiment, server 108 may determine the distances $d_n$ of the various types of transmission media 101a from the system information (e.g., maps) discussed above. Server 108 may also access known values for or calculate values for the corresponding velocities of signal propagation for each type of transmission media 101a. In this way, server 108 may calculate the timing offset for device 130, 110 using the formula above. In addition, the total timing offset for a given device 130, 110 may be determined by an application executed on server 108.

As an additional example of how server 108 may use the formula above, consider a scenario where server 108 already knows the total timing offset t for a given device 110, the velocities of signal propagation $r_1 \ldots r_n$ for each type of transmission media 101a between TS 104 and device 110, and all but one of the distances $d_1 \ldots d_n$ separating TS 104 and device 110. In this example, assume that the only unknown variable is the distance $d_n$, which may represent the length of transmission line 101a dropped from a given access node 140 to a user's residence 102 at which device 110 is located. Thus, in this example, server 108 may calculate the unknown distance (e.g., the length of drop line) using the equation above.

In other aspects, server 108 may determine an average value of the length of drop line into locations 102 based on data from a large number of devices 110 in use within network 100. Moreover, server 108 may use these average values to further average out the uncertainties in these values and to narrow down the location of a given wireless access node 140. For this and other purposes, server 108 may determine/verify the timing offset both for devices 130 that are a part of strand-mounted access nodes 140 and for devices 110 at locations 102 (e.g., within a given area) in network 100.

In addition, server 108 may determine the location of a user of user device 116 by requesting location information (e.g., GPS coordinate data) stored within user device 116. This information may be transmitted from user device 116 to server 108 in any number of ways. In one embodiment, location (e.g., GPS) information may be transmitted to server 108 via an application loaded onto user device 116.

In some aspects, server 108 may use wireless (e.g., Wi-Fi) information to determine the distance between an access node 140 from which a wireless signal is being transmitted and user device 116. Server 108 may determine this distance by collecting wireless information (e.g., Wi-Fi RSSI levels, Wi-Fi timing offset information, etc.) from both an access node 140 and user devices 116 connecting to access node 140. In this regard, wireless timing offset information may represent a time delay associated with transmitting a wireless signal from gateway 131 to user device 116.

Once server 108 has collected wireless RSSI information for user devices 116 (e.g., RSSI measurements such as −70 dBm, etc.), server 108 may correlate this information to the distance through which the signal has travelled (e.g., by using electromagnetic wave propagation principles such as those that state that radio waves travel as $1/r^2$ in free space and $1/r^3$ on Earth, where r represents the distance away from the signal source). Server 108 may also generate a plot of RSSI (y-axis) versus distance (x-axis) from an access node 140. In some aspects, server 108 may represent this plot as a scatter plot that when viewed statistically would have a log normal distribution around a line that has a negative slope. Depending on the propagation medium, the line would fall off as $1/r^2$ and/or $1/r^4$, where r represents the distance away from the signal source (e.g., access node 140). For instance, server 108 may use the following formula to statistically analyze RSSI levels to generate a line that represents the median power received at user devices 116:

$$P_r = G_r + G_t + P_t - 40 \text{ dB} - 10n \log_{10} d_{meters}$$

where $P_r$ is the power (e.g., in dBm) of the receive antenna (e.g., RSSI level reported on a user device 116), $G_r$ is the gain of the receive antenna (antenna gain of user device 116), $G_t$ is the gain of the transmit antenna (e.g., antenna gain of access node 140), $P_t$ is the power (e.g., in dBm) of the transmit antenna (e.g., Wi-Fi power transmitted from the access node 140), n is a path loss exponent (e.g., in most cases is 3 but may vary by terrain), and d is the distance in meters between the access node 140 and a user device 116. In one embodiment, server 108 may recognize that $P_t$ may be 27 dBm (0.5 Watts), $G_t$ may be 5 dBi, and $G_r$ may approximately be 0 dBi. Server 108 may also recognize that the actual measured power received at user devices 116 ($P_r$) would exhibit a statistical variation around the median expressed by the formula above. More details about the derivation of the formula above and related information may be found in the paper entitled "Design of Wireless Home Networks," presented at the Society of Cable Telecommunications Engineers (SCTE) Cable-Tec Expo '11, Nov. 15-17, 2011, Atlanta, Ga., which is herein incorporated by reference in its entirety.

In some aspects, server 108 may collect various measurements (e.g., made at the time of installation of access nodes 140) from devices 116 operated by individuals (employees, contractors, etc.) associated with a content or communications provider managing network 100. Server 108 may use these measurements to generate a scatter plot of wireless RSSI levels (y-axis) versus distance (x-axis) from an access node 140. Server 108 may also calculate various statistics (e.g., the path loss exponent, standard deviation, etc.) based on this plot. Over time, as users (e.g., customers, etc.) of user devices 116 transmit wireless information to server 108, server 108 may apply statistics generated from measurements made by individuals (e.g., employees, etc.) associated with a content or communications provider to the wireless information from users of user devices 116 in order to determine if an access node 140 has moved from a presumed location and/or needs to be moved for optimizing signal strength in a coverage area. If employees/contractors associated with a network operator have not made measurements of the wireless performance of an access node 140 within network 100, server 108 may rely solely on wireless (e.g., Wi-Fi) information transmitted from users (e.g., customers, etc.) of user devices 116 to generate a scatter plot of RSSI versus distance and to calculate the associated statistics. In this scenario, server 108 may also rely on location information (e.g., GPS coordinates) transmitted from user devices 116 and other data discussed herein (system maps, device timing offset, etc.) to estimate/optimize the location of access node 140 for creating a coverage area more responsive to user needs.

In implementing this or other algorithms for determining and optimizing the location of access nodes 140 in a network 100, server 108 may also recognize or determine that obstructions (e.g., buildings, moving vehicles, natural earth structures, etc.) in the signal path from any given access node 140 to user devices 116 may also affect the received signal strength. By statistically analyzing the wireless (e.g., Wi-Fi) RSSI levels of many different user devices 116 accessing any given access node 140 and taking into account the location of user devices 116 (e.g., via their GPS coordinates), server 108 may use a radio frequency (RF) propagation model to account for such obstructions in the signal pathway and to generate an estimate of the distances of user devices 116 from their corresponding access node 140. In other embodiments, timing offset information for a wireless signal received at user devices 116 from a given access node 140 may be statistically analyzed to determine a mean distance of user devices 116 from access node 140 and to pinpoint the location of access node 140.

In other aspects, server 108 may also analyze collected wireless (e.g., Wi-Fi) information to determine characteristics associated with microreflections in the signal pathway between an access node 140 and user devices 116. For instance, user device 116 may read a low RSSI level not because the user device 116 is far away from access node 140 but merely because there is an obstruction (e.g., building, etc.) in the signal pathway between the access node 140 and the user device 116. In this scenario, by analyzing the microreflections in the signal pathway, server 108 may confirm that an obstruction is actually present and that user device 116 is only a short distance away from its corresponding access node 140.

After an access node 140 has been localized, server 108 may use this information to create more accurate coverage data (e.g., maps) for the access node 140. For instance, server 108 may analyze wireless (e.g., Wi-Fi) information from user devices 116 to determine that a previously unknown obstruction is present within the vicinity of an access node 140. Server 108 may then use this information to generate an updated coverage map that shows the effects of this obstruction by reducing RSSI levels in the area where the identified obstruction is present.

In some aspects, in implementing an algorithm for determining and/or optimizing a location for an access node 140, server 108 may weight the importance/accuracy of a location measurement (e.g., GPS, etc.) obtained from one set of data differently from a location measurement obtained from another set of data. For example, server 108 may weight an access node location measurement calculated from wireless (e.g., Wi-Fi) path loss information (e.g., information related to RSSI levels versus distance) less significantly than a location measurement calculated from a device timing offset signal. In one embodiment, server 108 may weight location (e.g., GPS coordinate) information as the most important/accurate type of data and may weight wireless (e.g., Wi-Fi) information, device timing offset information, and system information (e.g., maps) as progressively less important/accurate for use in localizing/optimizing an access node.

Figure 3A:
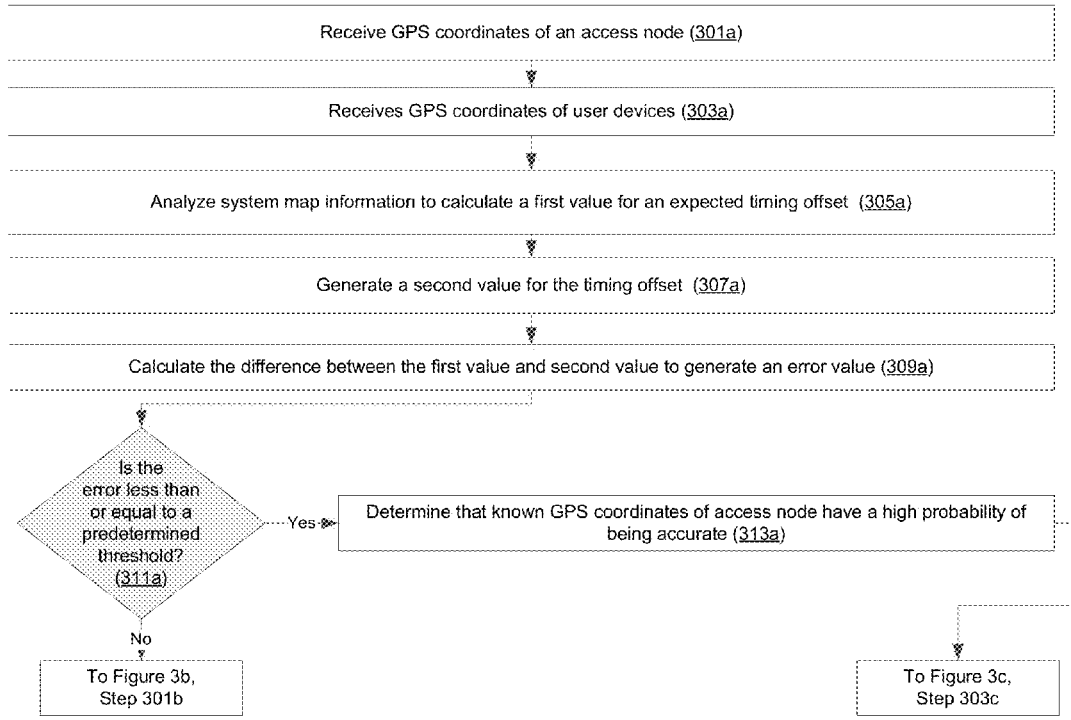
FIG. 3a shows a first flow diagram of a process, in accordance with various aspects of the disclosure.

FIG. 3a shows a first flow diagram of an example process for determining and optimizing the location of an access node 140. The process may start at step 301a where an installer, user, or other person, e.g., associated with a network operator of an access node 140, may report the location (e.g., GPS coordinates) of the access node 140 to server 108, where this data may be analyzed. Server 108 may assign a high level of importance/accuracy to this data (compared to the other data discussed herein) for use in determining/optimizing the location of access node 140. However, server 108 may also recognize that some uncertainty may remain in the location (e.g., GPS coordinate) data for a variety of reasons; for instance, an installer (or other individual) may have transmitted incorrect location (e.g., GPS coordinate) data and/or access node 140 may have been moved without having properly been documented within server 108 at a time after installation.

The process may then move to step 303a where various user devices 116 accessing access node 140 may transmit their locations (e.g., GPS coordinates) to server 108. Next, the process may move to step 305a where server 108 may request, receive, and analyze system information, such as maps, to localize access node 140. The server 108, or another computing device, may determine an expected timing offset for transmitting a signal between TS 104 and a device 130 residing in access node 140. For instance, in this example, server 108 may use system information (e.g., maps) to determine that there are 10 miles of fiber and 500 feet of coaxial cable between TS 104 and device 130. By using additional information related to known values of the velocity of propagation in each of transmission media 101a, server 108 may calculate an expected timing offset for each segment of the distance and sum these timing offsets to generate an expected total device timing offset.

Next, the process may move to step 307a where server 108 may generate a second value for the device timing offset (e.g., via predefined logic associated with central office 103) for device 130. Next, in step 309a, the difference between the device timing offset calculated in step 305a and the device timing offset generated in step 307a may be calculated and translated to a distance using the velocity of propagation in the appropriate transmission media 101a. This distance may indicate an error in the known location information (e.g., installer-provider GPS coordinates, etc.) of access node 140, an error in the system information (e.g., maps), and/or an error in the measured device timing offset. The process may then move to step 311a where server 108 may decide if the error calculated in step 309a is less than or equal to a predetermined threshold. If the error is less than a predetermined threshold, server 108 may determine that the known location information (e.g., installer-provided GPS coordinates, etc.) has a high probability of being accurate in step 313a.

After step 313a, the process may move directly to step 303c in FIG. 3c (discussed below) where wireless (e.g., Wi-Fi) measurements from user devices 116 may be analyzed. However, if the error calculated in step 309a is greater than a predetermined threshold, then, the process may move to step 301b in FIG. 3b (discussed below) where server 108 may determine that access node 140 has been relocated after initial installation and/or that an installer (or other individual) provided inaccurate location information (e.g., GPS coordinates).

Figure 3B:
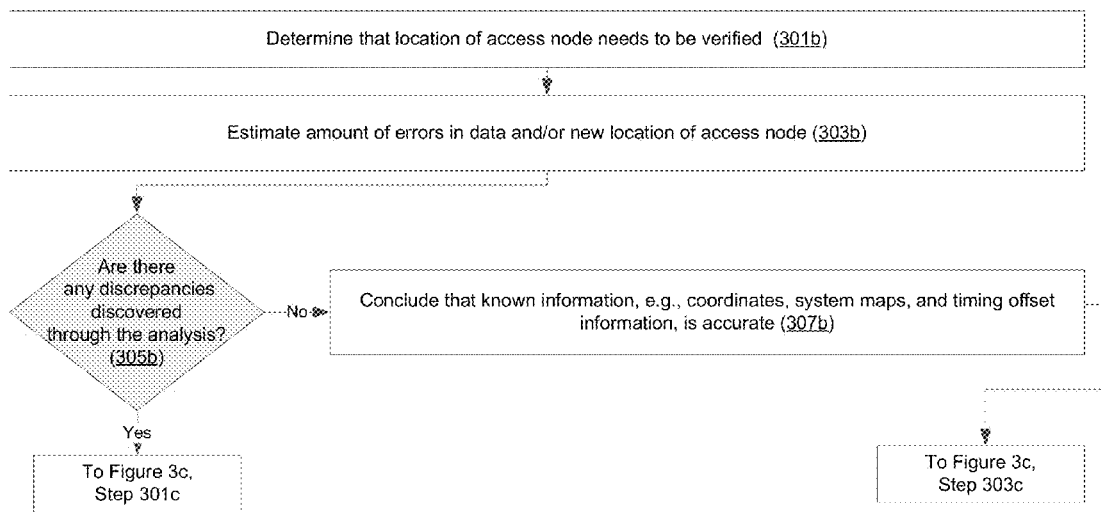
FIG. 3b shows a second flow diagram of a process, in accordance with various aspects of the disclosure.

FIG. 3b shows a second flow diagram of an example process for determining and optimizing the location of an access node 140. The process may start at step 301b where server 108 may determine that the location of an access node may need to be verified because the access node 140 has been relocated after initial installation and/or because the installer (or other person) provided inaccurate location information (e.g., GPS coordinates). The process may then move to step 303b where server 108 (or another computing device) may then estimate a new location of access node 140 and/or estimate the error in the known location information (e.g., GPS coordinates) of access node 140 in a variety of ways. For instance, server 108 may use the calculated/generated device timing offset with the system information to estimate a new location of access node 140. In addition, server 108 may use the timing offset of devices 110 that are within a predetermined distance of access node 140 to estimate the location of the access node 140. For instance, consider a scenario where there are 32 devices 110 (e.g., within businesses, residences, etc.) that are located within a predetermined distance (e.g., nearby) of access node 140. In this scenario, each of the 32 devices 110 may have at least three associated variables: a device latitude, longitude, and timing offset. In one embodiment, server 108 may calculate the latitude and longitude of devices 110 based on the physical street addresses at which they reside and the timing offsets from the various devices 110 may be received at server 108.

By performing a statistical analysis of nearby devices 110 in relation to the system information (e.g., maps) and the access node 140, server 108 may identify any errors in the known location information (e.g., installer-reported GPS coordinates) and/or may calculate a new estimated location of the access node 140. To perform this task, in one example, server 108 may plot the latitude, longitude, and timing offset for each of the 32 devices 110 on a system map and, once plotted, may scan the system map for discrepancies.

The process may then move to step 305b where server 108 may use the analysis performed in step 303b to decide if there are discrepancies in any of the data used to localize access node 140. If there are no discrepancies, server 108 may conclude, in step 307b, that the data (e.g., known location information, system information (e.g., maps), and/or device timing offset information, etc.) are accurate and access node 140 has been effectively localized. After step 307b, the process may move directly to step 303c in FIG. 3c(discussed below) where wireless (e.g., Wi-Fi) measurements from user devices 116 may be analyzed. If there are discrepancies discovered through the analysis in step 303b, server 108 may decide which of the data are inaccurate in step 301c of FIG. 3c (discussed below).

Figure 3C:
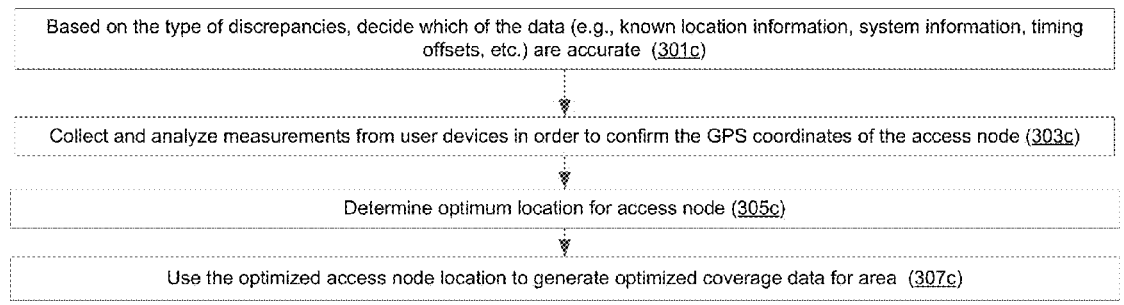
FIG. 3c shows a third flow diagram of a process, in accordance with various aspects of the disclosure.

FIG. 3c shows a third flow diagram of an example process for determining and optimizing the location of an access node 140. The process may start out at step 301c where server 108 may decide which of various pieces of data (known location information, system information, timing offsets, etc.) may be inaccurate (e.g., due to discrepancies in the data). For instance, server 108 may recognize that device timing offsets should increase as devices 110 move further from the TS 104 in system 100. If the device timing offsets do not follow this pattern, server 108 may conclude that the known location information (e.g., installer-reported GPS coordinates) of access node 140 is incorrect. In this scenario, server 108 may decide to reboot device 130 associated with access node 140. In addition, if several nearby devices 110 are tracking a single transmission line and if the system information shows the transmission line in a different location, then server 108 may conclude that the system information is inaccurate.

If the conclusion of step 301c is that the known location information (e.g., installer-reported GPS coordinates) of access node 140 are accurate, then the process may move to step 303c where server 108 may collect wireless (e.g., Wi-Fi) measurements from various user devices 116. Server 108 may analyze wireless (e.g., Wi-Fi) measurements from user devices 116 to confirm that the known location information of access node 140 is accurate and to determine the optimum location for access node 140.

If the conclusion of step 301c is that access node 140 may be in a different location from the initially understood, or presumed location (e.g., GPS coordinates), server 108 may collect wireless (e.g., Wi-Fi) information in step 303c to confirm that this conclusion is accurate and, once confirmed, to optimize where access node 140 should be located.

In step 303c, server 108 may collect wireless (e.g., Wi-Fi) measurements from, for example, at least two different types of users—measurements made by an operator (e.g., employee, etc.) associated with a network and measurements made by users (e.g., consumers, etc.) of the wireless (e.g., Wi-Fi) network. In some aspects, operator measurements may be more accurate, reliable, and complete while user measurements may be more relevant to the user experience.

Server 108 may collect many different types of wireless (e.g., Wi-Fi) measurements, including information on the RSSI levels of each user device 116 accessing content from a given access node 140. As mentioned earlier in step 303a of FIG. 3a, server 108 may also collect the location information (e.g., GPS coordinates (e.g., latitude, longitude, etc.)) of each user device 116. Once the wireless (e.g., Wi-Fi) information has been collected, server 108 may generate a plot of user locations relative to the access node 140 to determine if the access node 140 is nearby the location of users and to determine the RSSI levels and wireless (e.g., Wi-Fi) performance of each user device 116 accessing the access node 140.

Figure 4:
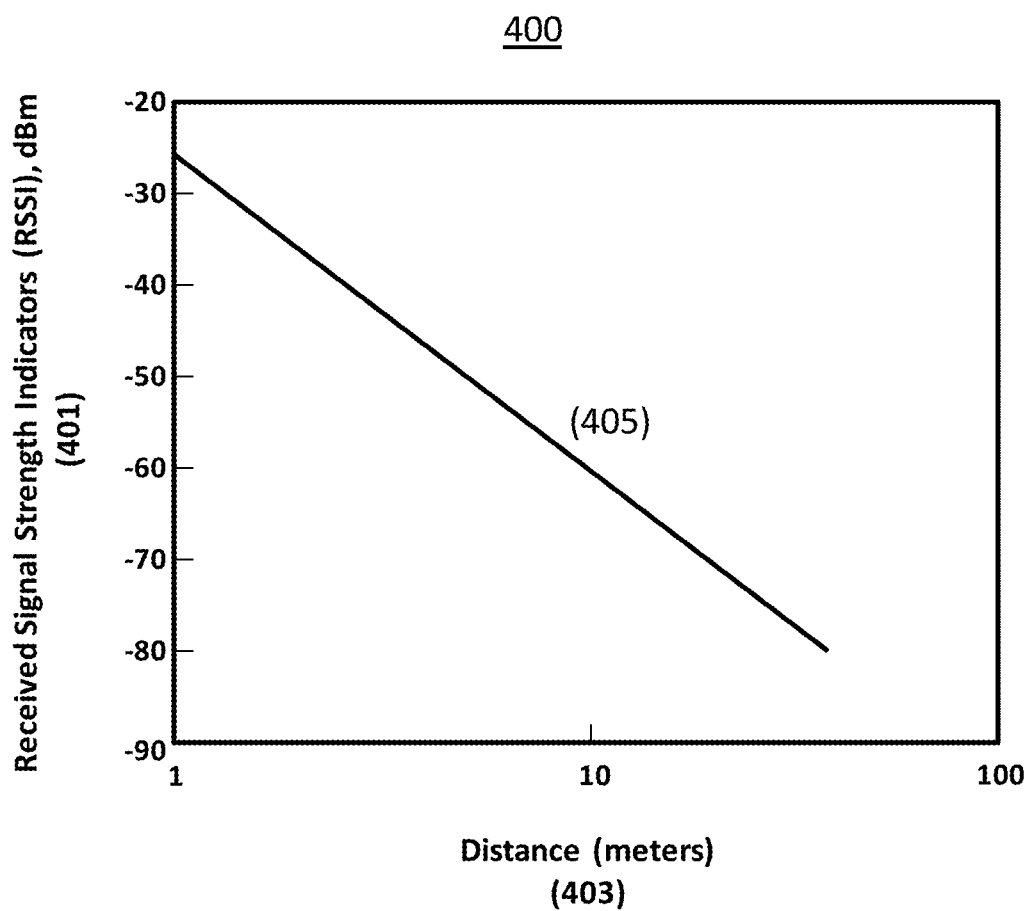
FIG. 4 shows an example graph of received signal strength indicator (RSSI) levels versus distance from an access node, in accordance with various aspects of the disclosure.

The process may then move to step 305c where server 108 may determine an optimum location of access node 140, e.g., by analyzing the plot to determine if there is a better location for access node 140 (e.g., a location that is on average closer to the users, etc.). As part of this procedure, server 108 may perform a statistical (e g , minimum mean squared, etc.) analysis of the wireless (e.g., Wi-Fi) data to determine a path loss exponent (e.g., the slope of the line when Wi-Fi RSSI (y-axis) is plotted versus distance (x-axis) on a log normal plot) and a standard deviation for the RF environment. FIG. 4 shows an example graph 400 of RSSI versus distance from an access node, in accordance with at least one aspect of the disclosure. Graph 400 shows RSSI levels 401 in dBm on the y-axis and distance 403 in meters on the x-axis. The slope of line 405 may be used to determine the path loss exponent.

Server 108 may also confirm that the calculated path loss exponent and standard deviation fall within an expected range (e.g., exact value is based on the propagation environment) for a log normal radio propagation model. In some aspects, the expected range for the path loss exponent may be 2.5-3.5 and the expected range for the standard deviation may be 5-8 dB. Also, as part of this analysis, in addition to optimizing the physical location of access node 140, server 108 may also refocus wireless services (e.g., of gateway 131) to better target (e.g., by refocusing wireless antennae, etc.) user devices 116.

In this analysis, a median path loss and a standard deviation around this median value may be calculated at a given distance from access node 140. These values, along with system information (e.g., maps) and the location (e.g., GPS coordinates) of user devices 116, may be used to determine a better location for the access node 140. To optimize the location of an access node 140, server 108 may move access node 140 to all possible locations along a relevant transmission line shown on system information, such as maps. At each point along the transmission line, server 108 may calculate a median wireless (e.g., Wi-Fi) RSSI level and/or probability for a good user experience for user devices 116 accessing the access node 140 (e.g., based on a distance from the access node 140). In this analysis, server 108 may also weight each point on the transmission line based upon the probability that a user is connected to the access node 140 at that point (e.g., based upon user-reported GPS coordinates).

If server 108 determines that the calculated values for the path loss exponent and standard deviation are outside the expected range, then server 108 may conclude that the access node 140 is not likely to be located at the location indicated by the known (e.g., installer-reported, etc.) location (e.g., GPS coordinates). Similarly, if the calculated path loss exponent changes by a predetermined amount after a fixed date, server 108 may conclude that the access node 140 may have been moved after the fixed date.

Aspects of the disclosure recognize that one uncertainty of user data is the percentage of users of user devices 116 that volunteer to provide data. For instance, if only one user agrees to provide data to server 108 for use in analysis and this user happens to use the access node 140 from a faraway distance, then server 108 may conclude that the access node 140 should be repositioned to be located closer to the user, if necessary precautions are not taken. In reality, many users may actually be connected to the access node 140 at a closer distance, but these users may not have agreed to report any data to server 108. Therefore, to prevent this scenario from occurring, server 108 may weight user data based upon a percentage of reporting users to total users (which server 108 may track) of a given access node 140. Thus, if most users are reporting data to server 108, server 108 may weight user data heavily in determining and optimizing a location for an access node 140. If, however, the percentage of reporting users is small compared to total users, server 108 may weight user data less significantly in determining and/or optimizing a location for an access node 140.

Once server 108 has determined and optimized a location for access node 140, server 108 may use the optimized location to generate optimized coverage data (e.g., a coverage map) for access node 140 in step 307c. The optimized coverage data (e.g., map) may be a color-coded map to depict RSSI levels throughout the coverage area. The optimized coverage data (e.g., map) may be dynamically updated to reflect the latest changes in data (e.g., due to seasonal changes, new obstructions, etc.) used in determining and/or optimizing a location for the access node 140. In some aspects, this coverage data (e.g., map) may be available to users of network 100 in a variety of formats, including over the Internet.

One of ordinary skill in the art would recognize that the methods shown in FIGS. 3a-3c may be performed piecemeal and not in their entirety.

Although the subject matter disclosed herein has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
 receiving, by a computing device, known location information for a first access node, the known location information corresponding to a network associated with the first access node;

determining, based on the known location information, a first value of a first timing offset for the first access node, wherein the first value of the first timing offset is based at least on an expected time for a signal to reach the first access node via a transmission line of the network;

determining a second value of the first timing offset;

determining a difference between the first value and the second value;

translating the difference to a known distance using a velocity of propagation in a transmission media;

responsive to the difference satisfying a first threshold associated with an expected timing offset, determining, by the computing device, that the known location information was inaccurate and determining a second timing offset for a second access node located within a predetermined distance of the first access node;

determining a level of inaccuracy of one or more of the first timing offset or the second timing offset; and responsive to whether the level of inaccuracy satisfies a second threshold associated with a discrepancy in a set of data used to determine the known location of the first access node, including known location, coverage map or timing offset information, performing a statistical analysis to determine which of the set of data are inaccurate, and based on the determination and a collection of wireless Received Signal Strength (RSSI) information from a plurality of user devices connected to the first access node, confirming the accuracy of the known location information for the first access node or adjust the known location information for the first access node.

2. The method of claim 1, further comprising: adjusting the location of the first access node by collecting and statistically analyzing the wireless RSSI information from the plurality of user devices connected to a gateway of the first access node.

3. The method of claim 2, further comprising: generating, by the computing device, a coverage map for an area serviced by the first access node using the adjusted location of the first access node.

4. The method of claim 3, further comprising: causing display of varying received signal strength indicator (RSSI) levels within the area on the coverage map.

5. The method of claim 3, further comprising: dynamically updating, by the computing device, the coverage map based on new data used for the adjusting the location of the first access node.

6. The method of claim 4, further comprising: causing display of the coverage map over the network.

7. The method of claim 1, further comprising: receiving global positioning system (GPS) coordinates as part of the known location information.

8. The method of claim 1, further comprising: receiving global positioning system (GPS) coordinates of the first access node as part of the known location information.

9. The method of claim 1, further comprising: performing a statistical analysis of the second timing offset as part of the determining the second timing offset.

10. The method of claim 2, further comprising: assigning, by the computing device, different weights that represent varying levels of importance given to the known location information, the first timing offset, and the wireless information in the adjusting the location of the first access node.

11. The method of claim 1, further comprising: receiving information related to locations, distances, and types of transmission media used within the network as part of the known location information.

12. The method of claim 2, further comprising: statistically analyzing the wireless information from the plurality of user devices that are operated by consumers of a provider associated with the network.

13. The method of claim 2, further comprising: analyzing Wi-Fi received signal strength indicator (RSSI) levels and global positioning system (GPS) coordinates from each of the plurality of user devices as part of the statistically analyzing of the wireless information.

14. The method of claim 2, further comprising: determining, by the computing device, a path loss exponent and a standard deviation for a wireless environment as part of the statistically analyzing the wireless information from the plurality of user devices.

15. The method of claim 2, further comprising: determining, by the computing device, a path loss exponent of between 2.5 and 3.5 and a standard deviation of between 5 and 8 decibels as part of the statistically analyzing the wireless information from the plurality of user devices.

16. An apparatus comprising:
a processor; and
a memory storing computer-readable instructions that, when executed by the processor, cause the apparatus to:
receive known location information for a first access node, the known location information corresponding to a network associated with the first access node;
determine, based on the known location information, a first value of a first timing offset for the first access node, wherein the first value of the first timing offset is based at least on an expected time for a signal to reach the first access node via a transmission line of the network;
determine a second value of the first timing offset;
determine a difference between the first value and the second value;
translate the difference to a known distance using a velocity of propagation in a transmission media;
responsive to the difference satisfying a first threshold associated with an expected timing offset, determine that the known location was inaccurate and a second timing offset for a second access node located within a predetermined distance of the first access node;
determine a level of inaccuracy of one or more of the first timing offset or the second timing offset; and
responsive to whether the level of inaccuracy satisfies a second threshold associated with a discrepancy in a set of data used to determine the known location of the first access node, including known location, coverage map or timing offset information, perform a statistical analysis to determine which of the set of data are inaccurate, and based on the determination and a collection of wireless Received Signal Strength (RSSI) information from a plurality of user devices connected to the first access node, confirm the accuracy of the known location information for the first access node or adjust the known location information for the first access node.

17. The apparatus of claim 16, wherein the at least a portion of the received known location information comprises the information related to the plurality of user devices communicating with the first access node.

18. The apparatus of claim 16, wherein the at least a portion of the received known location information comprises the known network location information related to the first access node.

* * * * *

UNITED STATES PATENT AND TRADEMARK OFFICE
CERTIFICATE OF CORRECTION

PATENT NO. : 9,609,614 B2
APPLICATION NO. : 13/483981
DATED : March 28, 2017
INVENTOR(S) : Ong et al.

It is certified that error appears in the above-identified patent and that said Letters Patent is hereby corrected as shown below:

In the Specification

Column 4, Detailed Description, Line 60:
Please delete "HTMLS," and insert --HTML5,--

Column 8, Detailed Description, Line 5-8:
Delete "$t = \frac{d_1}{d_1} + \frac{d_2}{r_2} + \ldots + \frac{d_n}{r_n}$" and insert -- $t = \frac{d_1}{r_1} + \frac{d_2}{r_2} + \ldots + \frac{d_n}{r_n}$ --

Column 11, Detailed Description, Line 43:
Delete "309ais" and insert --309a is--

Column 12, Detailed Description, Line 38:
Delete "3c(discussed below)" and insert --3c (discussed below)--

Signed and Sealed this
Thirteenth Day of February, 2018

Andrei Iancu
*Director of the United States Patent and Trademark Office*